United States Patent
Berger et al.

[11] Patent Number: 5,121,604
[45] Date of Patent: Jun. 16, 1992

[54] CONTROL OF SUPERCHARGED INTERNAL COMBUSTION ENGINES

[75] Inventors: Joachim Berger, Winterbach; Manfred Birk, Oberriexingen; Hermann Kull, Stuttgart; Wilfried Sautter, Ditzingen, all of Fed. Rep. of Germany

[73] Assignee: Robert Bosch GmbH, Stuttgart, Fed. Rep. of Germany

[21] Appl. No.: 445,619
[22] PCT Filed: May 7, 1988
[86] PCT No.: PCT/EP88/00395
§ 371 Date: Jan. 8, 1990
§ 102(e) Date: Jan. 8, 1990
[87] PCT Pub. No.: WO89/11027
PCT Pub. Date: Nov. 16, 1989
[51] Int. Cl.$^5$ .............................. F02D 23/00
[52] U.S. Cl. .............................. 60/602
[58] Field of Search .............................. 60/602

[56] References Cited

U.S. PATENT DOCUMENTS

| | | |
|---|---|---|
| 4,459,809 | 7/1984 | Tadokoro et al. ............ 60/602 |
| 4,556,038 | 12/1985 | Okamoto et al. ............ 60/602 |
| 4,646,522 | 3/1987 | Mamiya et al. ............ 60/602 |
| 4,686,830 | 10/1987 | Buck et al. ............ 60/602 |
| 4,807,147 | 2/1989 | Halbert et al. ............ 364/487 |

FOREIGN PATENT DOCUMENTS 0084037 6/1987 European Pat. Off. .

Primary Examiner—Richard A. Bertsch
Assistant Examiner—Charles G. Freay
Attorney, Agent, or Firm—Walter Ottesen

[57] ABSTRACT

In a turbocharged diesel engine (10), the charging pressure $P_{La}$ is adjusted to run the engine (10) with an empirically determined optimum fuel consumption. A charging pressure feedback signal $P_{La}$ is fed to a regulating device (40) which receives various operating parameters, including $ME_d$ which represents the power output. A characteristic field in a memory zone (50) in the regulating device (40) determines a control variable (TV) which operates a turbine by-pass valve (22) via an electro-pneumatic converter (28) and a penumatic (vacuum) actuator (26). The characteristic field is such that the charging presssure $P_{La}$ is reduced in the part load range (cruising speed) to improve fuel consumption.

6 Claims, 6 Drawing Sheets

CONTROL OF SUPERCHARGED INTERNAL COMBUSTION ENGINES

FIELD OF THE INVENTION

The invention relates to a method of controlling the charging pressure of a supercharged internal combustion engine. The invention also relates to devices for controlling the charging pressure of a supercharged internal combustion engine.

BACKGROUND OF THE INVENTION

A method and device of the kind referred to above are described in European Patent 0 084 037. In the known method and device, the characteristic field determines the desired charging pressure taking into account the output power, the composition of the exhaust gas, soot content of the exhaust, etc. As a result, supercharged diesel engines employing such method and device are supplied with too much air for combustion during most of the time of operation, for example when travelling at a comfortable cruising speed. The excess air is simply compressed and then expelled. The result is poor efficiency and high fuel consumption.

SUMMARY OF THE INVENTION

With the method and device of the invention, the charging pressure is reduced in the part load range, which is the range in which most vehicles are operated for most of the time.

It is convenient for the characteristic field to be a three-dimensional field comprising a range of curves to give a desired charging pressure for different engine speeds and different desired outputs (different injected fuel quantities per stroke in the case of a diesel engine or different air quantities in the case of a petrol engine) but for a given charging air temperature, e.g. 50° C. However, charging air temperature is an inportant operating parameter and it can be taken into account in accordance with other embodiments of the invention. Still other embodiments of the invention ensure that the engine is not mechanically overstressed.

Improved servo-control can be obtained with other embodiments of the invention and a provision for over-boost is obtained with still further embodiments of the invention.

BRIEF DESCRIPTION OF THE DRAWINGS

The invention is further described, by way of example, with reference to the accompanying drawings, in which.

DESCRIPTION OF THE PREFERRED EMBODIMENTS OF THE INVENTION

Figure 1:
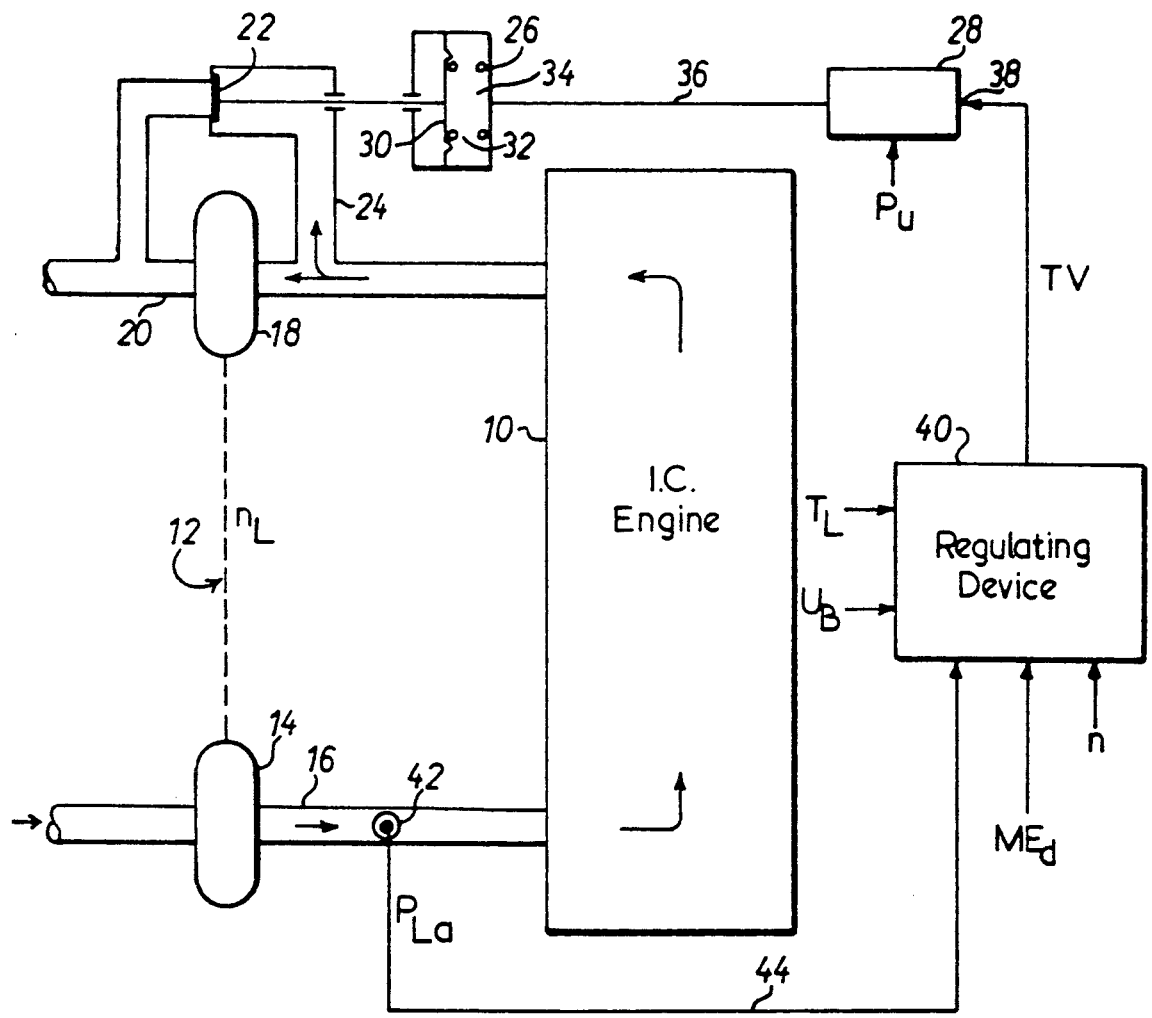
FIG. 1 is a block schematic diagram of a turbocharged diesel engine fitted with a control device in accordance with the invention.

FIG. 1 shows a diesel engine 10 fitted with a turbocharger 12 which comprises a compressor 14 in the induction passage 16 leading to the engine 10 and a turbine 18 in the exhaust gas passage 20 leading from the engine. The turbine 18 directly drives the compressor 14 at a speed $n_L$. The power output of the turbine 18 can be adjusted by means of a by-pass valve 22 (a so-called "wastegate") in a by-pass passage 24 by-passing the turbine 18. A pneumatic actuator 26 operates the by-pass valve 22. Instead of providing the by-pass valve and passage, the turbine could be of the variable geometry type, whereby the pneumatic actuator adjusts the turbine output by adjusting the turbine geometry. The pneumatic actuator is controlled by an electro-pneumatic converter 28. In the illustrated embodiment, the actuator 26 comprises a diaphragm 30 which is biassed in the closing direction of the by-pass valve 22 by a spring 32 which can open the by-pass valve 22 by application of vacuum to a chamber 34. The converter 28 controllably applies vacuum from a source $P_L$ to the chamber 34 via a conduit 36 in response to an electrical control variable TV received at an input 38. The vacuum source $P_u$ can be a vacuum pump driven by the engine 10.

The control variable TV is supplied by an electronic regulating device 40 which receives various operating parameters, as will be described, and a feedback signal comprising the actual absolute value $P_{La}$ of the charging pressure delivered by the compressor 14. To this end, a pressure transducer 42 is disposed in the induction passage 16 at the outlet side of the turbine 14 and is connected by a line 44 to the regulating device 40. The control variable TV fed to the electro-pneumatic converter 28 is in the form of a pulse train of variable duty ratio and the converter 28 is adapted to adjust the vacuum in the conduit 36 proportionally to the duty ratio of this pulse train.

Figure 2:
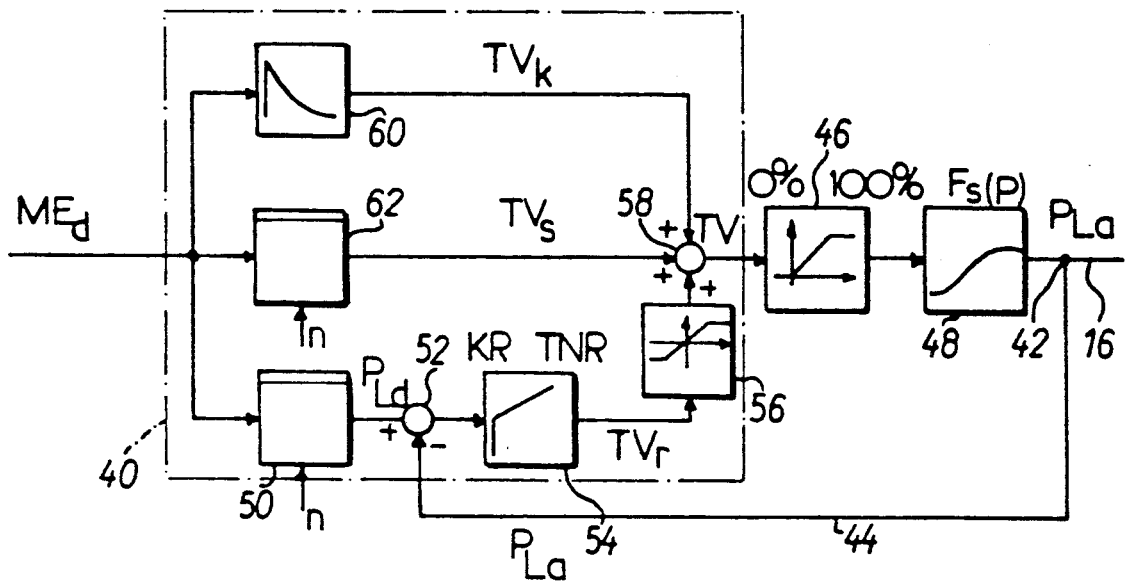
FIG. 2 is a block circuit diagram of the control device.

FIG. 2 illustrates the servo loop formed by the turbocharger 12, the pressure transducer 42, the regulating device 40, the converter 28, the actuator 26 and the by-pass valve 22. The converter 28 and the pneumatic actuator 26 are represented in FIG. 2 as a servomotor 46 and the by-pass valve 22 and the turbocharger 12 are represented as a function path 48. The regulating device 40 comprises a memory zone 50 in which is stored a characteristic field by which the desired absolute value $P_{Ld}$ of the charging pressure is delivered in accordance with an input parameter $ME_d$ representing the engine power output as set by the driver (pedal position) and in accordance with engine speed n. This characteristic field can be considered as comprising plots of the optimum charging pressure $P_{Ld}$ against engine speed for a range of values of engine power parameter $ME_d$. The optimum charging pressure $P_{Ld}$ is that obtained empirically to give the minimum fuel consumption, measured, for example, in liters per 100 km, when travelling in top gear at constant velocity.

Figure 3:
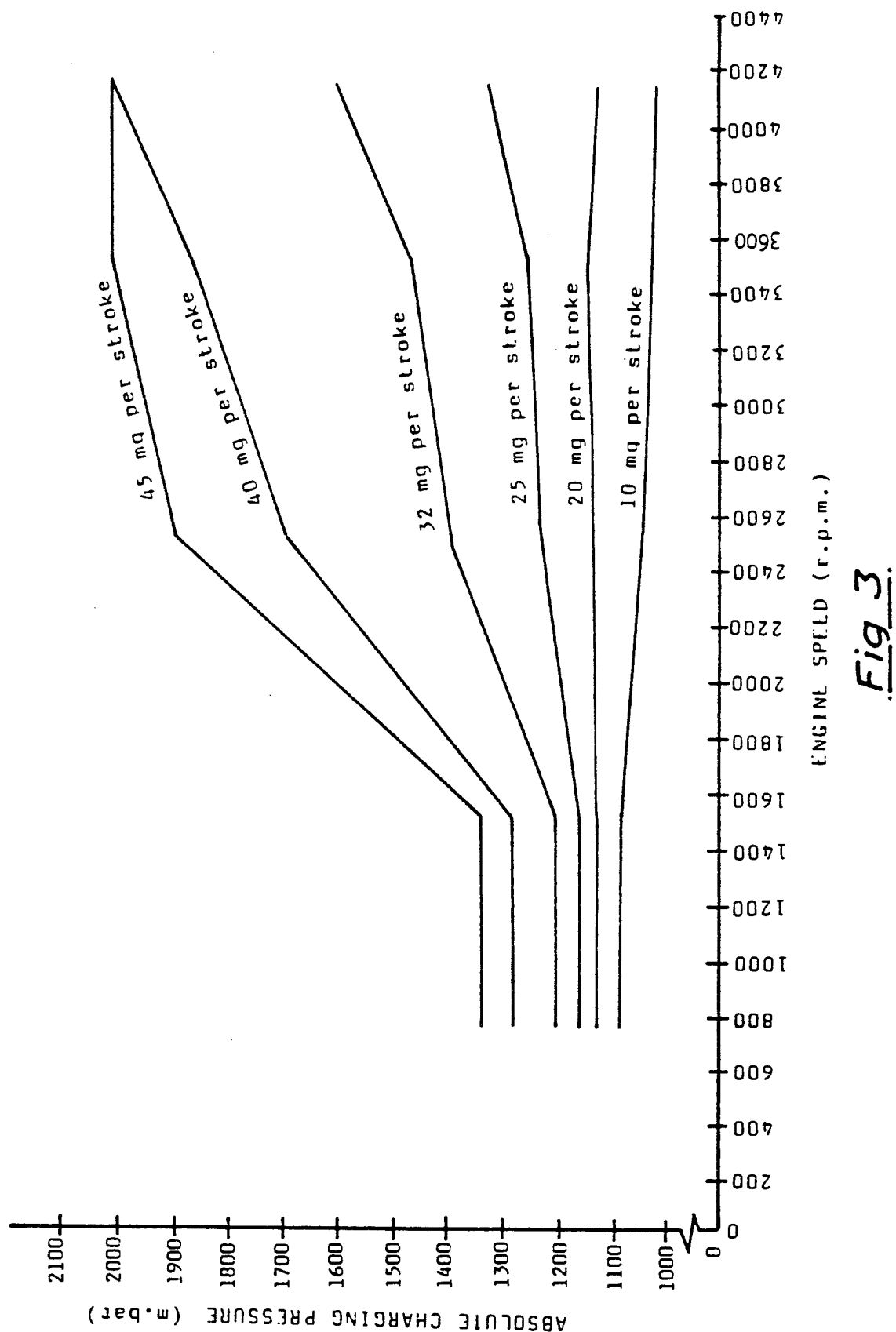
FIG. 3 represents in graphical form a characteristic field stored in a memory zone of the control device.

FIG. 3 illustrates a typical characteristic field stored in the memory zone 50. In FIG. 3, the absolute charging pressure $P_{Ld}$ is plotted against engine speed for various values of fuel supply quantities represented as mg per working stroke per cylinder, such a parameter being readily derivable from an electronic governor of a diesel engine or from an electronic injection system of a petrol engine. Since the power output is dependent on the product of injected fuel quantity per stroke and engine speed, the injected fuel quantity is a measure of the desired power at any one given speed.

To determine the characteristic field for any given engine type and turbocharger, it is necessary to conduct a series of tests on one or more prototypes. Thus, a series of graphs is made in which a specific fuel consumption is plotted against the charging pressure for a range of engine speeds and a range of torque outputs, the specific fuel consumption conveniently being measured as KWh output ("brake horsepower") per g fuel consumed. The lower charging pressure limits below which the exhaust gases become sooty are also noted. The characteristic field can then be calculated from these graphs.

The desired and actual values $P_{Ld}$ and $P_{La}$ of the absolute charging pressure are applied to a comparator 52 and the resulting error signal is fed to a PI-control 54. The output variable $TV_R$ from the PI-control 54 is passed via a limiter 56 and a summing junction 58 to be applied as the control variable TV to the control input of the servomotor 46. The limiter 56 determines the maximum value of the charging pressure to ensure that the variable $TV_R$ is limited in the event of a fault in the servo loop, such as failure of the pressure transducer 42. The PI-control 54 merely serves to improve the steady-state accuracy, that is, to stabilize the charging pressure.

Because of the presence of the limiter 56, the control circuit comprising the memory zone 50, the comparator 52 and the PI-control 54 has poor response characteristics. To improve dynamic response, the control variable TV is actually obtained from two variables, namely an output variable $TV_K$ from a precontrol 60 and the variable $TV_R$, but limited by the limiter 56, the variable $TV_K$ also being applied to the summing junction 58.

To improve dynamic response the power parameter $ME_d$ is applied to the precontrol 60 which is preferably a differentiating component with delay (DT 1-component).

Figure 4:
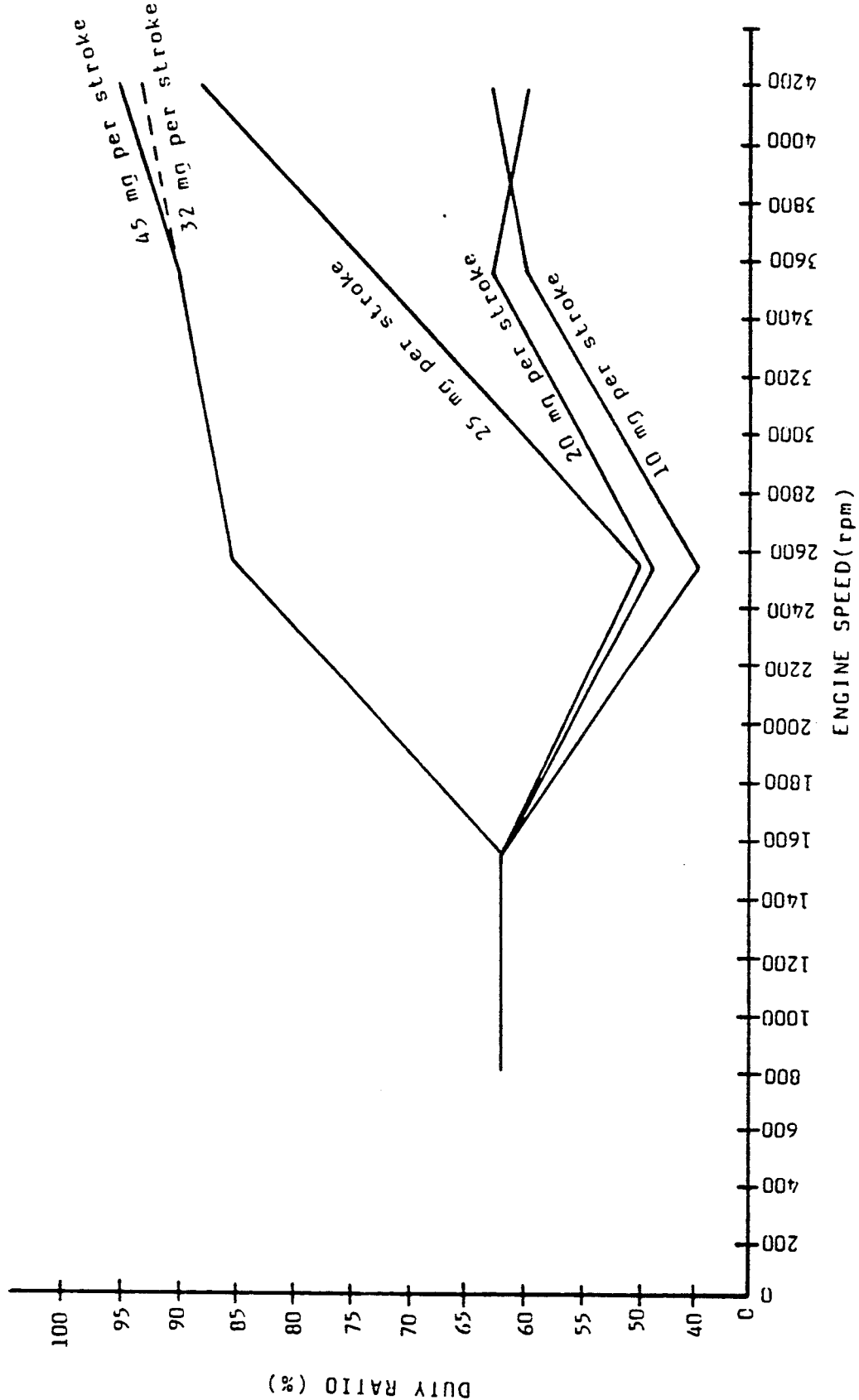
FIG. 4 represents a control characteristic field stored in another memory zone of the control device.

A control characteristic field stored in a memory zone 62 is brought into operation in the event of failure of the above-mentioned servo-loop including the feedback via the line 44 to the comparator 52. The output variable $TV_K$ from the memory zone 62 is fed to the servomotor 46 via the summing junction 58. FIG. 4 represents a typical control characteristic field for such standby operation. FIG. 4 is plotted similarly to FIG. 3, except that the duty ratio of the desired control variable is plotted along the ordinate instead of the desired charging pressure. The duty ratio of the pulse train is the ratio of the "off" interval (or space) to the sum of the "on" and "off" intervals (or pulse period) in the present case because a duty ratio of 100% means the by-pass valve 22 is fully open and the charging pressure is consequently minimum.

The control characteristics field stored in the memory zone 62 is calculated from the characteristic field in the memory zone 50 but is modified to take into account the non-linearity of the relationship between the actual charging pressure $P_{La}$ and the duty ratio of the control variable TV.

Figure 5:
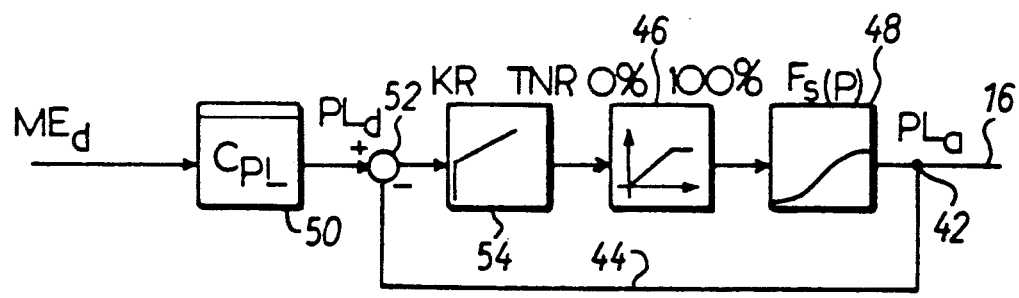
FIG. 5 is a block circuit diagram of a simplified control device.

In some applications, the simpler device shown in FIG. 5 is to be preferred. Parts like those of FIG. 2 are denoted by like reference numerals. The measures to be taken to enable continued operation of the device of FIG. 5 upon failure of the charging pressure transducer 42 will be apparent from the following description of FIG. 6.

Figure 6:
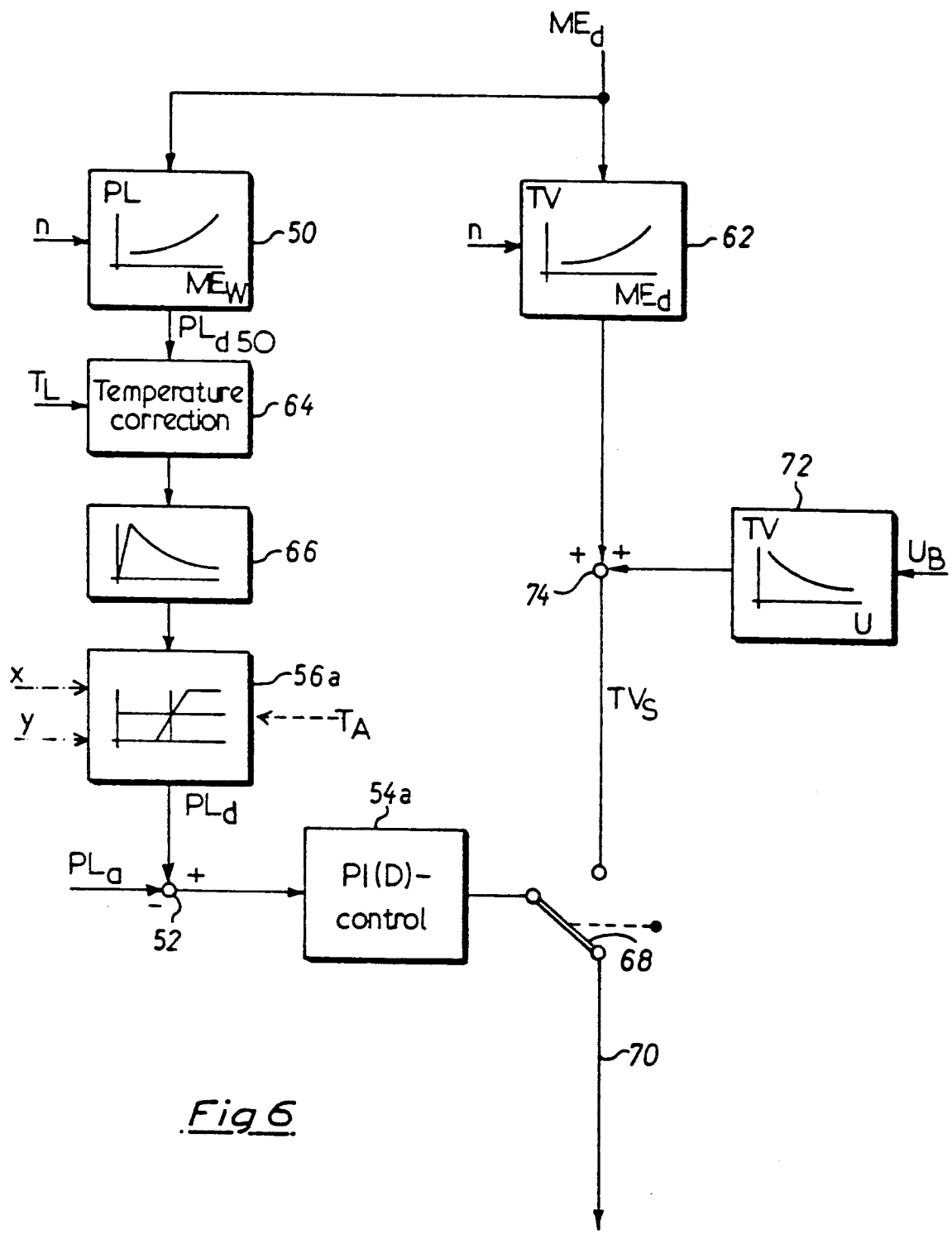
FIG. 6 is a more detailed block circuit diagram of part of the control device of FIG. 2.

FIG. 6 shows how the output from the memory zone 50 in which the characteristic field is stored may be corrected in accordance with temperature. This characteristic field is calculated for a nominal charging temperature of, for example, 50° C. or 313° K. and its output $P_{Ld50}$ is fed to a temperature correction circuit 64. The actual value of the charging temperature, measured as an absolute value by means of a temperature sensor in the induction passage 16 downstream of the compressor 14, is also fed to the temperature correction circuit 64 which corrects the desired value of the charging pressure in accordance with the well-known general gas equation $P/P=RT$. This feature is applicable to the embodiments of FIGS. 2 and 5.

Because the differential part of the servo-control of the charging pressure in FIG. 5 can lead to too large an amplification of transient fluctuations, a suitable dynamic pre-filter 66 is placed in advance of the comparator 52, as shown in FIG. 6. As a consequence, it is necessary to place the limiter 56a for limiting the charging pressure to a safe maximum between the pre-filter 66 and the comparator 52. The output from the latter is fed to a PI(D)-control 54a whose control is limited and whose output is delivered via an electronic switch 68 to a line 70 connected to the end stages. These end stages are represented by the electro-pneumatic servomotor and the pneumatic actuator 26 forming the servomotor 46.

The electronic switch 68 is changed over automatically upon failure of the servo loop. It enables the charging pressure $P_{La}$ to be adjusted by the control characteristic field stored in the memory zone 62 to which the input parameter $ME_d$ and the engine speed n are fed. The electronic switch 68 is shown in its normal position in which the control variable $TV_S$ is disconnected. Upon occurance of a fault in the servo-loop, the switch 68 is changed over to its other state in which the line 70 is disconnected from the PI(D)-control 54a and instead is connected to receive the variable $TV_S$. The control characteristic field stored in the memory zone 62 is designed to avoid too high a charging pressure $P_{La}$.

Because the response of the electro-pneumatic converter 28 is dependent on the peak voltage of its input pulse train, the output from the control characteristic field in the memory zone 62 must be corrected to take account of variation in the voltage $U_B$ of the vehicle battery. To this end, the battery voltage $U_B$ is applied to a control circuit 72 whose output is applied to a summing junction 74 between the memory zone 62 and the switch 68. This feature is applicable to the devices of FIGS. 2 and 5.

It is useful to provide for an increased charging pressure (overboost) for a desired rapid acceleration (kick-down of the accelerator pedal) and the engine may be able to withstand the higher peak cylinder pressure resulting from a higher charging pressure for a short time or when the engine is cold.

Provision for overboost can be made in the circuit of FIG. 6 by feeding to the limiter 56a a parameter x obtained by means of a pedal travel sensor and dependent upon accelerator pedal velocity and from an engine operating parameter y in order to raise or remove the limit on the maximum charging pressure. The parameter x can be an actual measure of the accelerator pedal velocity or it can be a measure of the time taken to depress the pedal through a given travel, for example 80% to 100% of its possible full travel. The parameter y can be the occurrance of a gear change, up or down, a predetermined short time before the depression of the accelerator pedal so that overboost can only be brought in just after a gear change. Another possibility for the parameter y is a signal that the engine speed n is below a predetermined speed before depression of the accelerator pedal. Overboost can then be used only when the engine is being accelerated from a relatively low speed.

Another way of providing for overboost is to feed a temperature $T_A$, such as exhaust gas temperature, which is indicative of the engine temperature to the limiter 56a as is also shown in FIG. 6. Overboost, that is a higher maximum charging pressure, is then operative so long as the engine remains relatively cold but becomes impossible once the engine has warmed up.

When operative under overboost conditions in the case of a diesel engine, it is also possible to increase the injected fuel quantity to obtain a higher output torque and power. This is useful during certain manoeuvres, such as overtaking.

Figure 7:
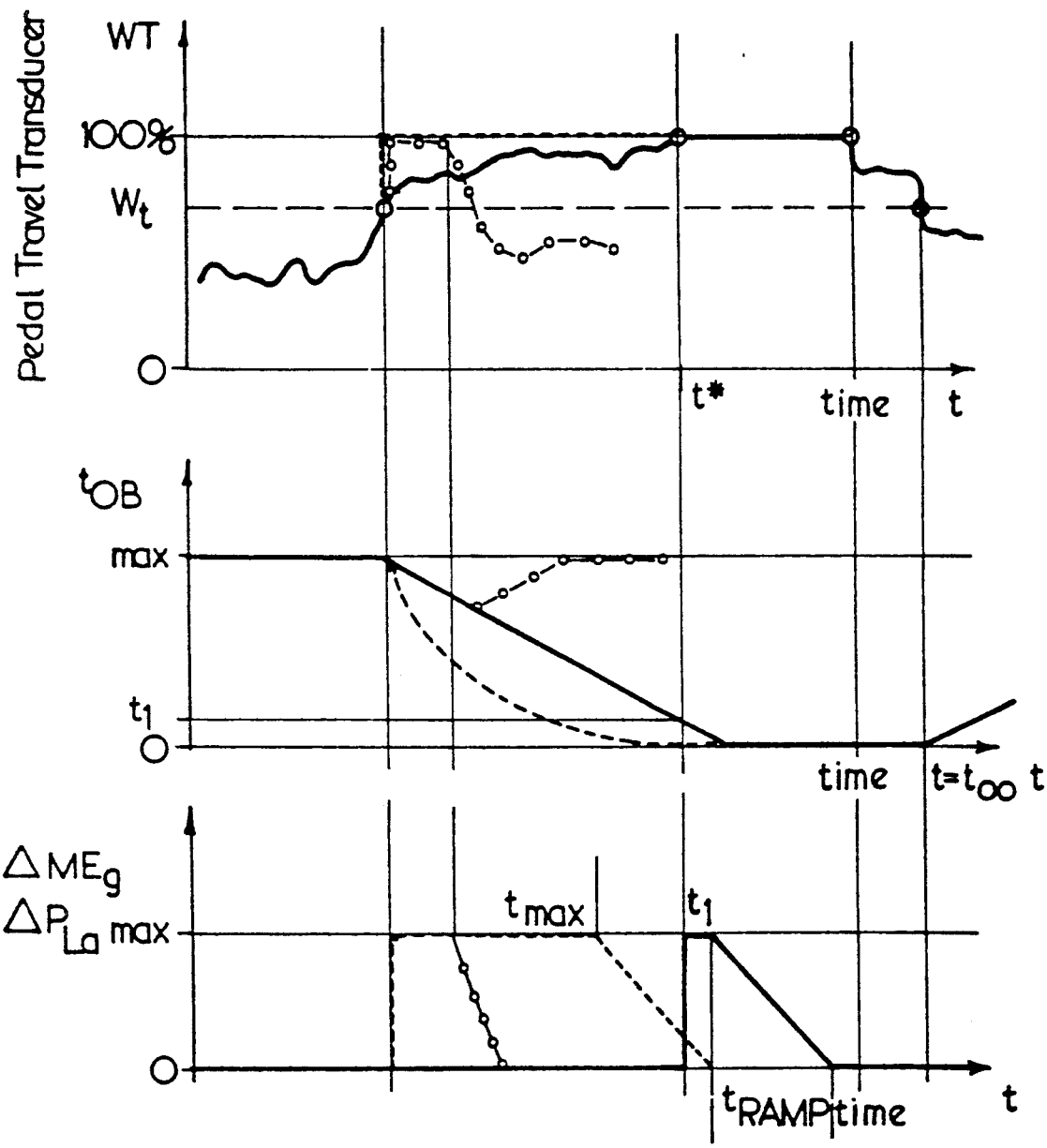
FIG. 7 shows graphs to illustrate over-boost.

Conversely, with the use of a fuel injection system for a diesel engine fitted with an electronic governor wherein there is a facility to increase the injected fuel quantity for a short period of time to obtain an increased output torque, it is possible to close the by-pass valve 22 or another valve in the by-pass passage 24 by means of the signal which triggers temporarily increased fuel quantity. This signal can be derived from a pedal position transducer. The upper graph in FIG. 7 is a plot of a typical pedal travel w effected as desired by the driver against time t. The lower graph represents the extra fuel quantity $\Delta ME$ and the extra charging pressure $\Delta P_{La}$ for overboost. The middle graph represents the time available for overboost to take place.

The overboost can be brought in from the instant $t^*$ when the pedal reaches 100% travel as shown in full lines. The overboost then operates independently of the circuitry of FIGS. 1, 2 and 3.

The arrangement is preferably such that the overboost cannot last beyond a short length of time, for example 20 to 30 seconds and such that overboost cannot be repeated until after a relatively long interval. This is in order that the engine will not be damaged and that the exhaust gas temperature will not become too high. An integrator can be provided for timing the overboost, that is to say for controlling the time $t_{OB}$ available for overboost. The exhaust gases become hotter when travelling in the power range close to full power. The integrator is triggered when the output from the pedal travel transducer exceeds a threshold $w_t$ of, for example 70% full travel. The time $t_{OB}$ available for overboost then gradually becomes shorter (linearly or exponentially) as driving in the high power range is continued. Thus, only a relatively short time $t_1$ is available for overboost when the pedal reaches maximum travel as shown in the top graph. Not until the pedal travel transducer output falls below the threshold $w_t$ at the instant $t_\infty$ does the integrator come into operation again to permit further overboost and to increase gradually the time $t_{OB}$ available for overboost.

At the end of the overboost, the injected fuel quantity and the charging pressure can fall to their normal permitted maximum over a suitable time interval $t_{ramp}$.

What is claimed is:

1. A system for controlling the charging pressure of an internal combustion engine of a motor vehicle, the system comprising:

sensing means for sensing the actual value of the charging pressure $P_{La}$;

control means for supplying a desired-value $P_{Ld}$ of the charging pressure in dependence upon a plurality of operating characteristic variables (n, $ME_d$, $T_L$);

actuator means for adjusting the charging pressure of the engine;

comparator means for comparing said desired value $P_{Ld}$ of the charging pressure with said actual value $P_{La}$ of the charging pressure to generate an output variable for driving said actuator means to adjust the charging pressure of the engine; and, limit means for limiting the charging pressure to a maximum value and for allowing said charging pressure to exceed said maximum value during acceleration of said motor vehicle provided that all of the following conditions are satisfied at the same time: the engine is at a temperature below a pregiven threshold, the engine is running at an engine speed below a pregiven threshold; and, a pregiven time duration has elapsed since a last increase in said charging pressure.

2. The system of claim 1, wherein: after said charging pressure is increased to a higher value, said charging pressure remains at said higher value for a pregiven time duration (T1) and thereafter is taken back to said desired value pursuant to a pregiven function.

3. The system of claim 1, wherein the motor vehicle has an accelerator pedal; and, acceleration is detected from the actuation of the accelerator pedal.

4. The system of claim 1, wherein acceleration is detected from an increase in said desired value $P_{Ld}$ of said charging pressure.

5. A system for controlling the charging pressure of an internal combustion engine of a motor vehicle, the system comprising:

sensing means for sensing the actual value of the charging pressure $P_{La}$;

control means for supplying a desired-value $P_{Ld}$ of the charging pressure in dependence upon a plurality of operating characteristic variables (n, $ME_d$, $T_L$);

actuator means for adjusting the charging pressure of the engine;

comparator means for comparing said desired value $P_{Ld}$ of the charging pressure with said actual value $P_{La}$ of the charging pressure to generate an output variable for driving said actuator means to adjust the charging pressure of the engine;

limit means for limiting the charging pressure to a maximum value and for allowing said charging pressure to exceed said maximum value during acceleration of said motor vehicle provided that all of the following conditions are satisfied at the same time: the engine is at a temperature below a pregiven threshold; the engine is running at an engine speed below a pregiven threshold; and, a pregiven time duration has elapsed since a last increase in said charging pressure;

after said charging pressure is increased to a higher value, said charging pressure remaining at said higher value for a pregiven time duration (T1) and thereafter is taken back to said desired value pursuant to a pregiven function;

a further increase in said charging pressure taking place only after a further time duration (T2) has elapsed; and, said further time duration (T2) being greater than said pregiven time duration (T1).

6. A system for controlling the charging pressure of an internal combustion engine of a motor vehicle, the system comprising:

sensing means for sensing the actual value of the charging pressure $P_{La}$;

control means for supplying a desired-value $P_{Ld}$ of the charging pressure in dependence upon a plurality of operating characteristic variables (n, $ME_d$, $T_L$);

actuator means for adjusting the charging pressure of the engine;

comparator means for comparing said desired value $P_{Ld}$ of the charging pressure with said actual value $P_{La}$ of the charging pressure to generate an output variable for driving said actuator means to adjust the charging pressure of the engine; and, limit means for limiting the charging pressure to a maximum value and for allowing said charging pressure to exceed said maximum value during acceleration of said motor vehicle provided that all of the following conditions are satisfied at the same time: the engine is at a temperature below a pregiven threshold; the engine is running at an engine speed below a pregiven threshold; and, a pregiven time duration has elapsed since a last increase in said charging pressure; and, the motor vehicle having an accelerator pedal and a gear transmission; and, said charging pressure being increased when the accelerator pedal and the gear shift are actuated.

* * * * *